United States Patent
Cho et al.

(10) Patent No.: US 11,995,264 B2
(45) Date of Patent: May 28, 2024

(54) ELECTRONIC DEVICE AND OPERATION METHOD OF THE ELECTRONIC DEVICE FOR CONTROLLING ACTIVATION OF A TOUCH INPUT

(71) Applicant: SAMSUNG ELECTRONICS CO., LTD., Suwon-si (KR)

(72) Inventors: Youngho Cho, Suwon-si (KR); Juhyeon Park, Suwon-si (KR); Kiwon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/857,499

(22) Filed: Jul. 5, 2022

(65) Prior Publication Data

US 2022/0334702 A1 Oct. 20, 2022

Related U.S. Application Data

(63) Continuation of application No. PCT/KR2021/003054, filed on Mar. 11, 2021.

(30) Foreign Application Priority Data

Apr. 24, 2020 (KR) ................... 10-2020-0050370

(51) Int. Cl.
*G06F 3/041* (2006.01)
*G06F 1/16* (2006.01)

(52) U.S. Cl.
CPC ........ *G06F 3/04166* (2019.05); *G06F 1/1643* (2013.01); *G06F 1/1652* (2013.01)

(58) Field of Classification Search
CPC .. G06F 1/1643; G06F 1/1652; G06F 3/04166; G06F 3/04186
See application file for complete search history.

(56) References Cited

U.S. PATENT DOCUMENTS 9,041,663 B2 5/2015 Westerman
9,696,767 B2 7/2017 Gan
(Continued)

FOREIGN PATENT DOCUMENTS

KR 10-2013-0030179 3/2013
KR 10-2014-0051590 5/2014
(Continued)

OTHER PUBLICATIONS

International Search Report for PCT/KR2021/003054, dated Jun. 22, 2021, 3 pages.
(Continued)

*Primary Examiner* — Chun-Nan Lin
(74) *Attorney, Agent, or Firm* — Nixon & Vanderhye P.C.

(57) ABSTRACT

An electronic device, according to an embodiment of the disclosure, may comprise: a touchscreen including a first portion and a second portion; a memory; and a processor operatively connected to the touchscreen and the memory. The memory may store instructions that, when executed, cause the processor to: recognize a first point at which a touch input is in contact with the second portion, recognize a second point at which the touch input is separated from the touch screen, recognize at least one third point at which the touch input is periodically in contact with the touch screen in a state in which the touch input is in contact with the touch screen, and activate the touch input based on whether at least one of the second point and the at least one third point is located outside a specified area having a specified radius set with respect to the first point.

20 Claims, 12 Drawing Sheets

(56) References Cited

U.S. PATENT DOCUMENTS

| | | | |
|---|---|---|---|
| 9,891,732 B2 | 2/2018 | Westerman | |
| 10,747,428 B2 | 8/2020 | Westerman | |
| 2011/0285645 A1 | 11/2011 | Cho et al. | |
| 2012/0023459 A1* | 1/2012 | Westerman | G06F 3/04186 455/566 |
| 2012/0056817 A1* | 3/2012 | Griffin | G06F 3/04886 345/173 |
| 2013/0335319 A1* | 12/2013 | Balasundaram | G06F 3/03547 345/156 |
| 2014/0078073 A1 | 3/2014 | Gan | |
| 2014/0320420 A1* | 10/2014 | Ida | G06F 3/04817 345/173 |
| 2015/0054733 A1* | 2/2015 | Pedersen | G06F 3/162 345/156 |
| 2017/0123590 A1 | 5/2017 | Han et al. | |
| 2018/0088795 A1* | 3/2018 | van Os | H04W 4/02 |
| 2018/0150152 A1 | 5/2018 | Westerman | |
| 2019/0179487 A1* | 6/2019 | Kong | G06F 3/0416 |

FOREIGN PATENT DOCUMENTS

| | | |
|---|---|---|
| KR | 10-2014-0147647 | 12/2014 |
| KR | 10-2016-0042824 | 4/2016 |
| KR | 10-2016-0149262 | 12/2016 |

OTHER PUBLICATIONS

Written Opinion of the ISA for PCT/KR2021/003054, dated Jun. 22, 2021, 4 pages.

* cited by examiner

ELECTRONIC DEVICE AND OPERATION METHOD OF THE ELECTRONIC DEVICE FOR CONTROLLING ACTIVATION OF A TOUCH INPUT

CROSS-REFERENCE TO RELATED APPLICATIONS

This application is a continuation of International Application No. PCT/KR2021/003054 designating the United States, filed on Mar. 11, 2021, in the Korean Intellectual Property Receiving Office and claiming priority to Korean Patent Application No. 10-2020-0050370, filed on Apr. 24, 2020, in the Korean Intellectual Property Office, the disclosures of which are incorporated by reference herein in their entireties.

BACKGROUND

Field

The disclosure relates to an electronic device for controlling activation of a touch input of a user and an operating method thereof.

Description of Related Art

As an electronic technology is gradually developed, various types of electronic products are being developed and distributed. In particular, in recent years, a spread of electronic devices having a touch screen, such as a smart phone, a tablet PC, and the like, is expanding.

The touch screen may be operated in a capacitive, pressure-sensitive, or optical manner depending on the operation method. Recently, a capacitive touch screen has been used because a recognition accuracy for a touch input is high and a multi-touch is available. The capacitive touch screen may recognize the touch input based on a change in a charge amount of an electrode included in a touch panel.

SUMMARY

Embodiments of the disclosure provide an electronic device and an operation method of the electronic device that reduce malfunctions, which may occur because of a scheme or a location for a user to hold the electronic device.

Embodiments of the disclosure provide an electronic device and an operation method of the electronic device that determine whether to activate a touch input of a user based on a time point, a location, or an area of the touch input of the user reaching a touch screen.

Embodiments of the disclosure provide an electronic device and an operation method of the electronic device that may reduce malfunctions of the electronic device regardless of a shape or a direction in which a user holds the electronic device.

An electronic device according to an example embodiment includes: a touch screen including a first portion and a second portion, a memory, and a processor operatively connected to the touch screen and the memory. According to an example embodiment, the memory stores instructions that, when executed, cause the processor to: recognize a first point where a touch input reaches the second portion, recognize a second point where the touch input is separated (or released) from the touch screen, periodically recognize one or more third points where the touch input reaches the touch screen while the touch input is in contact with the touch screen, and activate the touch input based on whether at least one of the second point and the one or more third points is located out of a specified region having a specified radius specified with respect to the first point.

In addition, an electronic device according to an example embodiment includes: a touch screen including a first portion and a second portion, a memory, and a processor operatively connected to the touch screen and the memory. According to an example embodiment, the memory stores instructions that, when executed, cause the processor to: recognize a first point where a touch input reaches the second portion, recognize a second point where the touch input is separated (or released) from the touch screen, periodically recognize one or more third points where the touch input reaches the touch screen while the touch input is in contact with the touch screen, and activate the touch input based on whether a difference between a time at which the first point is recognized and a time at which the second point is recognized exceeds a specified duration.

In addition, according to an example embodiment, a method of operating an electronic device including a touch screen including a first portion and a second portion an embodiment includes: recognizing a first point where a touch input reaches the second portion of the touch screen, periodically recognizing one or more third points where the touch input reaches the touch screen while the touch input is in contact with the touch screen, recognizing a second point where the touch input is separated (or released) from the touch screen, and activating the touch input based on whether at least one of the second point and the one or more third points is located out of a specified region having a specified radius specified with respect to the first point.

According to an example embodiment, the malfunctions, which may occur because of the scheme or the location for the user to hold the electronic device, may be reduced.

According to an example embodiment, whether the touch input of the user is valid may be determined based on at least one of the time point, the location, or the area of the touch input of the user reaching the touch screen.

According to an example embodiment, whether the touch input of the user meets the intention of the user may be determined based on the time point, the location, or the area of the touch input of the user reaching the touch screen.

According to an example embodiment, the malfunctions of the electronic device may be reduced regardless of the shape or the direction in which the user holds the electronic device.

In addition, various effects that are directly or indirectly identified through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used for the same or similar components.

DETAILED DESCRIPTION

Figure 1:
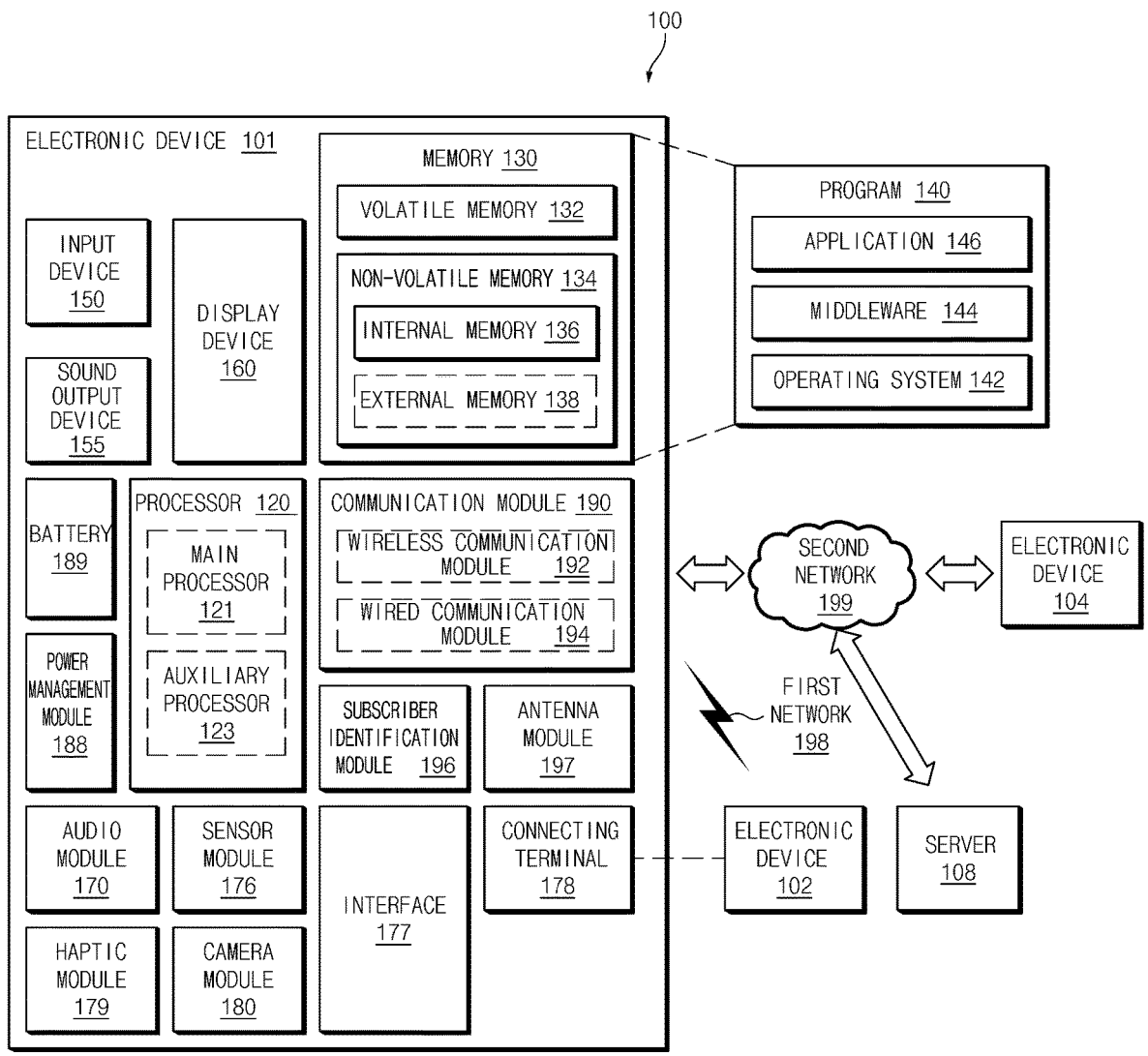
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
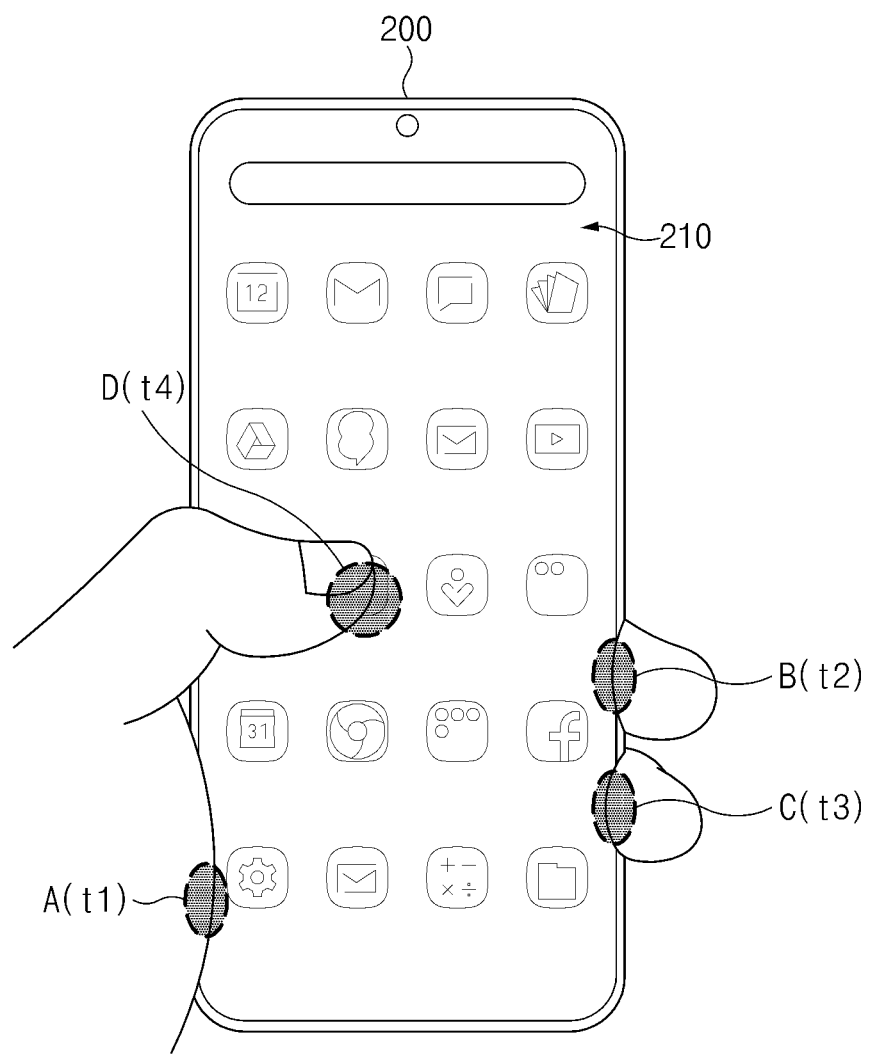
FIG. 2 is a diagram illustrating an example operation of an electronic device based on a location where a user holds an electronic device according to an embodiment.

FIG. 2 is a diagram illustrating an example operation of an electronic device based on a location where a user holds an electronic device according to an embodiment.

Referring to FIG. 2, an example in which the user holds an electronic device 200 (e.g., the electronic device 101 in FIG. 1) is shown. For example, a portion of a user's body may sequentially touch a touch screen 210 (e.g., the display device 160 in FIG. 1) included in the electronic device 200. For example, at least a portion of a user's hand may reach a point A at a first time point t1. Next, at least a portion of the user's hand may touch a point B at a second time point t2, touch a point C at a third time point t3, and touch a point D at a fourth time point t4.

For example, the points A to C shown in FIG. 2 may include a point where at least the portion of the user's body (e.g., a user's finger) has no choice but to reach when the user holds the electronic device with the hand without an intention of activating an event. For example, the points A to C may not be locations where the user touches the electronic device 200 (or comes into contact with the touch screen) with the intention of activating the event. For example, when the user touches the point D while holding the electronic device 200 with one hand, the portion of the user's hand may touch the points A to C.

According to a comparative example, the electronic device 200 may sense a touch input. For example, the electronic device 200 may sense a first touch input onto the touch screen 210, and may activate an event related to the recognized touch input. Referring to FIG. 2, the electronic device 200 may determine the point A, at which at least the portion of the user's body touches the touch screen 210 at the first time point t1 among the first to fourth time points t1 to t4, as a point intended to be touched by the user. For example, the electronic device 200 may activate an event corresponding to the touch input reaching the point A. For example, the user actually intended to touch the point D, but the event for touch input reaching the point A is activated, so that events for the touch inputs reaching the points B to D may be deactivated. For example, because the electronic device 200 does not recognize the touch inputs for the points B to D, the user may think that the electronic device 200 does not operate as intended.

According to another comparative example, the electronic device 200 may sense two touch inputs that sequentially reach the touch screen 210. For example, the electronic device 200 may sense the first touch input and a second touch input in an order of reaching the touch screen 210. Referring to FIG. 2, the electronic device 200 may recognize the point A, at which at least the portion of the user's body touches the touch screen 210 at the first time point t1, and the point B, at which at least the portion of the user's body touches the touch screen 210 at the second time point t2, as points intended to be touched by the user. Although the user actually had an intention to touch the point D, but, unlike the intention of the user, the electronic device 200 may sense only the touch inputs that reach the points A and B, and may activate an event corresponding thereto. For example, because the electronic device 200 does not recognize the touch input for the point D, the user may think that the electronic device 200 does not operate as intended.

According to another comparative example, when the electronic device 200 includes the touch screen 210 at least a portion of which is formed in a curved shape, the electronic device 200 may sense a touch input that is not intended by the user in the curved portion of the touch screen 210 and may activate an event that is not intended. For example, when the user holds the electronic device 200, the user's body may touch at least the portion of the touch screen 210 that is formed in the curved shape. The electronic device 200 may recognize the touch input reaching the curved surface of the touch screen 210. The touch input recognized by the electronic device 200 may include a touch input not intended by the user to activate a specific event.

According to an embodiment of the disclosure, when sensing the touch input of the user, the electronic device 200 may determine the intention of the touch input of the user so as to reduce an event corresponding to the touch input that is not intended by the user from being activated. For example, the electronic device 200 according to an embodiment may determine whether the touch input is intended by the user regardless of the order in which the portion of the user's body touches the electronic device 200. The electronic device 200 according to an embodiment may prevent a touch misoperation irrespective of which direction the electronic device 200 is directed among a horizontal direction and a vertical direction. For example, the electronic device 200 may determine whether the touch input provided onto the touch screen 210 meets the intention of the user regardless of the direction in which the electronic device 200 is directed while the user holds the electronic device 200 with hand. For example, the electronic device 200 according to an embodiment may determine the intention of the user based on at least one of a contact point of the touch input (e.g., a location where at least the portion of the user's body is in contact with the touch screen), a movement of the touch input (e.g., a distance traveled by at least the portion of the user's body in contact with the touch screen), an area of the touch input (e.g., an area in which at least the portion of the user's body is in contact with the touch screen), and/or a contact time point of the touch input (e.g., t1 to t4, a difference between two time points among t1 to t4, or a maintaining time of a touch input), activate the touch input to the point D, which is determined to be intended by the user, and deactivate the touch inputs to the points A to C, which are determined not to be intended by the user.

According to an embodiment, the electronic device 200 may include a foldable electronic device (not shown). The foldable electronic device may have an in-fold shape or an out-fold shape based on a folding scheme. The foldable electronic device may have a shape that may be folded twice or more.

When the electronic device 200 according to an embodiment includes the foldable electronic device, the electronic device 200 may include a front surface (e.g., a surface viewed by the user) and a rear surface (or a back surface) (e.g., a surface that the user is not able to view). In this case, a touch screen region exposed via the front surface of the electronic device 200 and a touch screen region exposed via the rear surface of the electronic device 200 may operate independently or in association with each other.

According to an embodiment, touch sensors respectively included in the touch screen regions exposed via the front surface and the rear surface of the electronic device 200 may operate by being electrically separated from each other. For example, when the touch sensor of the touch screen region exposed via the front surface of the electronic device 200 is activated, the touch sensor of the touch screen region exposed via the rear surface may be deactivated. The electronic device 200 according to an embodiment may treat a touch input of the user input to the touch screen region exposed via the rear surface as invalid based on the activation of the touch sensor of the touch screen region exposed via the front surface.

The electronic device 200 according to an embodiment may determine whether the touch input of the user input to the touch screen region exposed via the front surface is input by the intention of the user, and may treat the touch input of the user input to the touch screen region exposed via the rear surface as invalid.

For example, the electronic device 200 may treat the touch input of the user input to the touch screen region exposed via the rear surface of the electronic device 200 as invalid, and may treat the touch input of the user in contact with the touch screen region exposed via the front surface as valid or invalid based on the movement of the touch input, the area of the touch input, or the contact time of the touch input according to embodiments of the disclosure when a point where the touch input of the user comes into contact with the touch screen region exposed via the front surface is located at an edge of the touch screen.

In another example, the electronic device 200 may treat the touch input of the user input to the touch screen region exposed via the rear surface of the electronic device 200 as invalid, and may treat the touch input of the user in contact with the touch screen region exposed via the front surface as valid when the point where the touch input of the user comes into contact with the touch screen region exposed via the front surface is not located at the edge of the touch screen.

Figure 3:
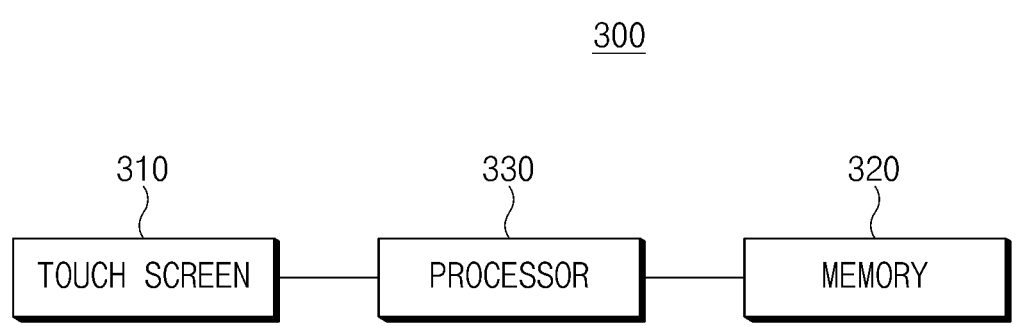
FIG. 3 is a block diagram illustrating an example configuration of an electronic device, according to an embodiment.

FIG. 3 is a block diagram illustrating an example configuration of an electronic device, according to various embodiments.

According to an embodiment, an electronic device 300 (e.g., the electronic device 101 in FIG. 1 or the electronic device 200 in FIG. 2) may include a touch screen 310 (e.g., the display device 160 in FIG. 1 or the touch screen 210 in FIG. 2), a memory 320 (e.g., the memory 130 in FIG. 1), and a processor (e.g., including processing circuitry) 330 (e.g., the processor 120 in FIG. 1).

According to an embodiment, the touch screen 310 may sense a touch input provided by the user. For example, the touch screen 310 may sense that the portion of the user's body (e.g., the hand) is in contact with the touch screen 310. According to an embodiment, the touch screen 310 may provide information about the sensed touch input to the processor 330. For example, the information about the touch input may include at least one of information about a location at which the touch input comes into contact with the touch screen 310, information about a location at which the touch input is separated (or released) from the touch screen 310, and a size of an area of the touch input. For example, the information about the touch input may include information about a duration the touch input stays on the touch screen 310. In an embodiment, the location information may include coordinate information based on a first reference axis (an X-directional axis) and a second reference axis (a Y-directional axis) of the touch screen 310.

For example, the touch screen 310 may provide location information of a first point at which the touch input of the user reaches the touch screen 310 and a second point at which the touch input is separated (or released) from the touch screen 310 to the processor 330. For example, the touch screen 310 may provide time point information indicating a time point at which the first point is sensed and time point information indicating a time point at which the second point is sensed to the processor 330. For example, the touch screen 310 may provide information obtained by periodically sensing the touch input between the time point at which the first point is sensed and the time point at which the second point is sensed to the processor 330.

According to an embodiment, the processor 330 may include various processing circuitry and obtain the information about the touch input from the touch screen 310. The processor 330 may control the memory 320 to temporarily and/or non-temporarily store at least a portion of the information related to the touch input.

According to an embodiment, the processor 330 may determine whether the touch input is provided by the user with a specific intention (e.g., icon click or drag) based on the information about the touch input stored in the memory 320. For example, the processor 330 may determine whether the touch input is provided by the user with the specific intention based on at least one of the point at which the touch input is separated from the touch screen 310, the duration the touch input stays on the touch screen 310, and the size of the area of the touch input.

According to an embodiment, the processor 330 may activate an event corresponding to the touch input based on a result of determining whether the touch input is provided by the user with the specific intention. For example, the processor 330 may activate or deactivate an event corresponding to the touch input based on at least one of the point at which the touch input is separated from the touch screen 310, the duration the touch input stays on the touch screen 310, and the size of the area of the touch input.

According to an embodiment, when the second point at which the touch input is separated from the touch screen 310 is located outside a specified region, the processor 330 may activate the event corresponding to the touch input. According to an embodiment, when the second point at which the touch input is separated from the touch screen 310 is located within the specified region, the processor 330 may deactivate the event corresponding to the touch input.

According to an embodiment, when the touch input is separated from the touch screen 310 within a specified duration, the processor 330 may activate the event corresponding to the touch input. When the touch input is separated from the touch screen 310 exceeding the specified duration, the processor 330 may deactivate the event corresponding to the touch input.

According to an embodiment, when the second point at which the touch input is separated from the touch screen 310 is located within the specified region and the touch input is separated from the touch screen 310 within the specified duration, the processor 330 may activate the event corresponding to the touch input.

According to an embodiment, when the duration the touch input stays on the touch screen 310 is equal to or shorter than the specified duration and the size of the area of the touch input exceeds a threshold value, the processor 330 may deactivate the event corresponding to the touch input.

Figure 4:
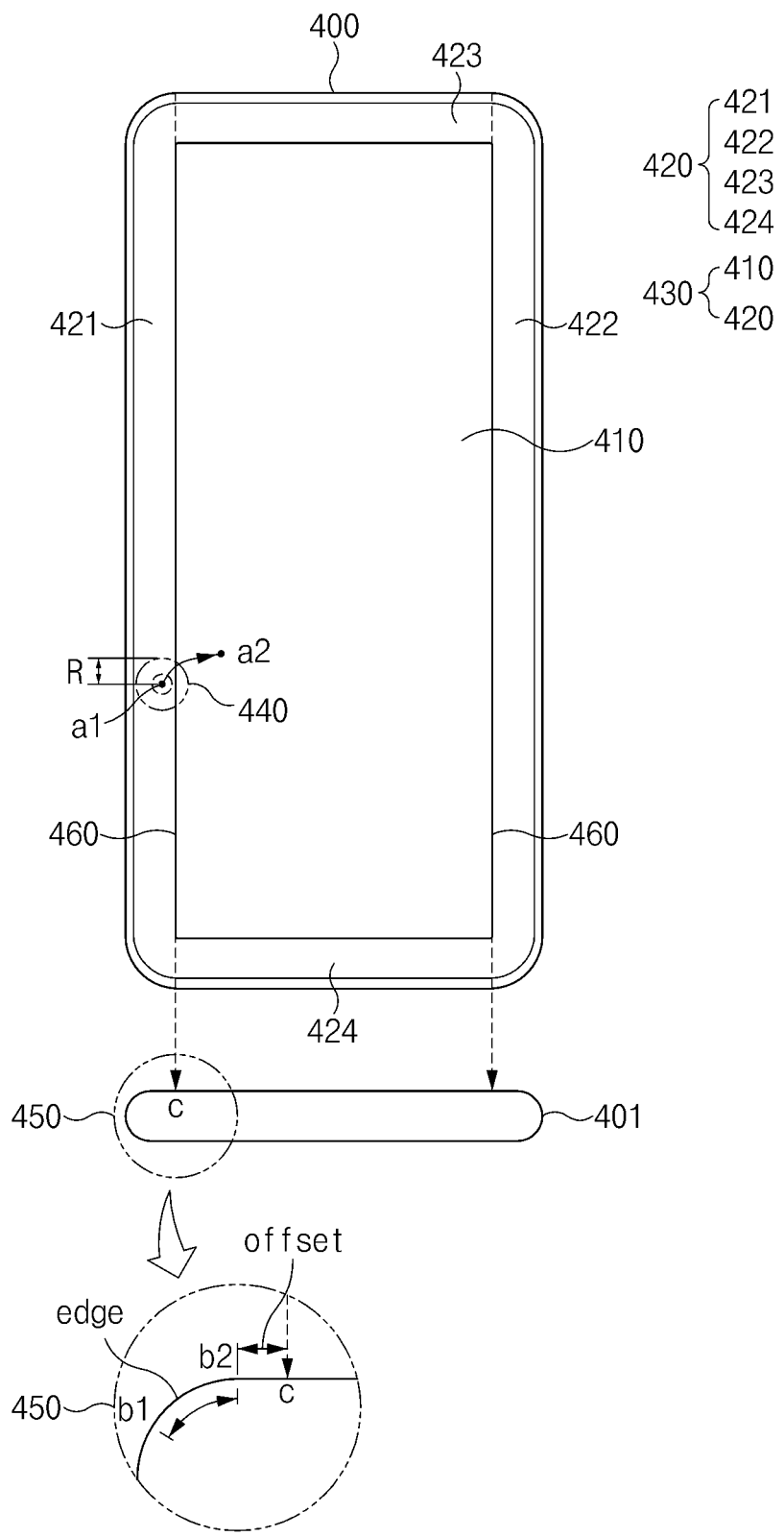
FIG. 4 is a diagram illustrating an example structure of an electronic device according to an embodiment.

FIG. 4 is a diagram illustrating an example structure of an electronic device according to an embodiment.

According to an embodiment, an electronic device 400 (e.g., the electronic device 101 in FIG. 1, the electronic device 200 in FIG. 2, or the electronic device 300 in FIG. 3) may include a touch screen 430 (e.g., the display device 160 in FIG. 1, the touch screen 210 in FIG. 2, or the touch screen 310 in FIG. 3) including a first portion 410 and a second portion 420. According to an embodiment, the touch screen 430 may include a planar region and a curved region, or may include only the planar region. According to an embodiment, the curved region of the touch screen 430 may form at least a portion of a side surface of the electronic device 400. According to an embodiment, the first portion 410 of the touch screen 430 may be relatively located at a center of the touch screen 430, and the second portion 420 of the touch screen 430 may be relatively located at an edge of the touch screen 430. For example, the second portion 420 of the touch screen 430 may be located at the edge of the touch screen 430 to form at least a portion of an outer edge of the touch screen 430.

According to an embodiment, the first portion 410 may include at least a portion of the planar region of the touch screen 430. According to an embodiment, the second portion 420 may include at least a portion of the curved region of the touch screen 430. For example, the first portion 410 may be relatively located at the center of the touch screen 430 compared to the second portion 420. For example, the second portion 420 may be relatively located at the edge of the touch screen 430 compared to the first portion 410.

According to an embodiment, the electronic device 400 may set an edge boundary 460 that is located close to the center of the touch screen 430 by a preset offset from a boundary between the planar region and the curved region included in the touch screen 430.

Referring to FIG. 4, one side surface 401 showing a lower (e.g., a lower portion based on the drawing) side surface of the electronic device 400 is shown. One side surface 401 may include a region 450 including the curved surface as at least a portion thereof. According to an embodiment, the edge boundary 460 may be set at a location close to the center of the touch screen 430 by the preset offset from a point b2 corresponding to a boundary line between the planar region and the curved region of the touch screen 430. Referring to FIG. 4, a point where the edge boundary 460 meets one side surface 401 of the electronic device 400 may be a point "c".

According to an embodiment, the electronic device 400 may set the first portion 410 at the center of the touch screen 430 compared to the second portion 420 based on the edge boundary 460. On the other hand, the electronic device 400 may set the second portion 420 at the edge of the touch screen 430 compared to the first portion 410 based on the edge boundary 460.

According to an embodiment, both the first portion 410 and the second portion 420 may include the planar region. For example, the first portion 410 may be relatively located at the center of the touch screen 430 compared to the second portion 420. The second portion 420 may be relatively located at the edge of the touch screen 430 compared to the first portion. For example, the second portion 420 may include a region within a certain distance from the edge of the touch screen 430. According to an embodiment, the electronic device 400 may set the edge boundary 460 based on a size of a bezel. For example, the electronic device 400 may set the edge boundary 460 separated from the edge of the touch screen 430 by the certain distance determined based on the size of the bezel. The electronic device 400 may include the first portion 410 close to the center of the touch screen 430 and the second portion 420 close to the edge of the touch screen 430, based on the edge boundary 460.

Referring to FIG. 4, the second portion 420 is shown to be located at all edges of four sides of the touch screen 430, but the second portion 420 may be located at at least one of the edges of the four sides of the touch screen 430. For example, the second portion 420 may include a first sub-portion 421 and a second sub-portion 422. As another example, the second portion 420 may include the first sub-portion 421, the second sub-portion 422, a third sub-portion 423, and a fourth sub-portion 424. The first portion 410 and the second portion 420 shown in FIG. 4 are only an example, and thus are not interpreted as being limited to those shown in FIG. 4.

According to an embodiment, the electronic device 400 may sense a touch input 440 of the user. For example, the electronic device 400 may sense the touch input 440 of the user reaching the touch screen 430 using at least one of a resistive scheme, a capacitive scheme, an ultrasonic scheme, and an infrared scheme. According to an embodiment, the electronic device 400 may recognize at least one point based on a magnitude of a pressure or a force. For example, the electronic device 400 may recognize a point of the touch screens 430 to which the greatest force is applied. For example, the electronic device 400 may recognize a first point a1 at which the touch input 440 of the user comes into contact with the touch screen 430.

According to an embodiment, the electronic device 400 may recognize a second point a2 at which the touch input 440 of the user is separated (or released) from the touch screen 430 after being moved from the first point a1 while in contact with the touch screen 430. For example, when the user clicks the touch screen 430 once, the first point a1 may include a point at which the user's finger starts to be in contact with the touch screen 430. The second point a2 may include a point at which the user's finger is separated from the touch screen 430 after coming into contact with the touch screen 430. In an embodiment, the first point a1 may be included in the second portion 420. For example, the second point a2 may be included in the first portion 410.

According to an embodiment, the touch screen 430 may include a specified region determined by the first point a1 and a specified radius R. According to an embodiment, the specified radius R may be set (or determined) based on a curvature at which the edge (or the curved region) included in the second portion 420 is designed. According to an embodiment, the specified radius R may be set (or determined) based on the bezel size.

Referring to FIG. 4, the side surface 401 showing the lower side surface (e.g., the lower portion based on the drawing) of the electronic device 400 is shown. The touch screen 430 according to an embodiment may be located on at least a partial surface of one side surface 401.

Referring to FIG. 4, the side surface 401 may include the region 450 including the curved surface as at least the portion thereof. The region 450 including the curved surface may include a curved section b1~b2 in which a portion of a cross-section is curved. According to an embodiment, the electronic device 400 may set (or determine) the specified radius R based on the curvature at which an edge (or a curved region) of the electronic device 400 corresponding to the curved section b1~b2 is designed.

According to an embodiment, the electronic device 400 may determine whether the touch input 440 of the user meets the intention of the user based on a location of the second point a2. According to an embodiment, the electronic device 400 may determine whether the touch input 440 of the user is input by the intention of the user based on the location of the second point a2 with respect to the specified region. According to an embodiment, the electronic device 400 may determine whether the user provides the touch input 440 to activate the event based on the location of the second point a2 with respect to the specified region. According to an embodiment, the electronic device 400 may determine the specified region using the first point a1 and the specified radius R. For example, the specified region may include a region within the specified radius R from the first point a1.

According to an embodiment, the electronic device 400 may determine that the touch input 440 of the user is input by the intention of the user based on whether the second point a2 is located within the specified region. For example, the second point a2 may be included within the specified region away from the first point a1 by the specified radius R.

Figure 5:
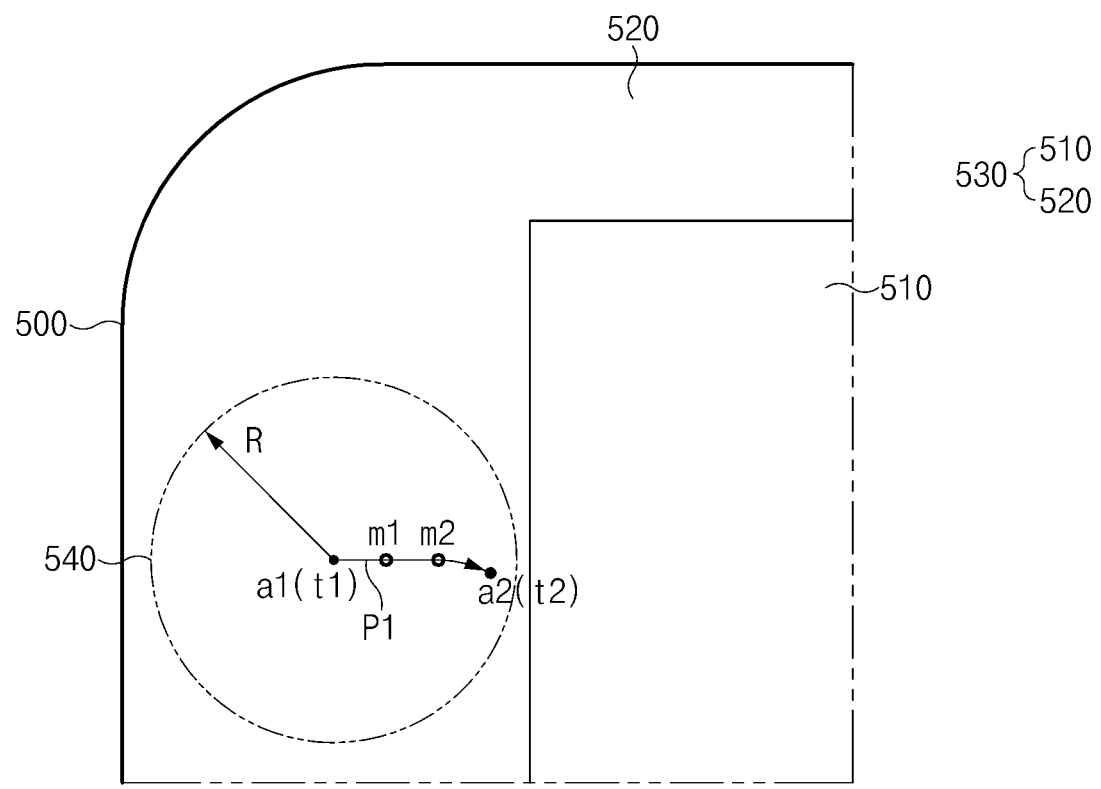
FIG. 5 is a diagram illustrating activation of a touch input of a user by an electronic device according to an embodiment.

FIG. 5 is a diagram illustrating activation, by an electronic device of a touch input of a user according to an embodiment.

According to an embodiment, an electronic device 500 (e.g., the electronic device 101 in FIG. 1, the electronic device 200 in FIG. 2, the electronic device 300 in FIG. 3, or the electronic device 400 in FIG. 4) may include a touch screen 530 (e.g., the display device 160 in FIG. 1, the touch screen 210 in FIG. 2, the touch screen 310 in FIG. 3, or the touch screen 430 in FIG. 4) on at least a partial surface thereof. The touch screen 530 according to an embodiment may include a first portion 510 and a second portion 520. For example, the first portion 510 may be relatively located at a center of the touch screen 530 compared to the second portion 520. For example, the second portion 520 may be relatively located at an edge of the touch screen 530 compared to the first portion 510. According to an embodiment, the first portion 510 may include at least a portion of a planar region of the touch screen 530. According to an embodiment, the second portion 520 may include at least a portion of a curved region of the touch screen 530.

According to an embodiment, the user may hold the electronic device 500 using the portion of the body (e.g., the hand). For example, the user may hold the electronic device 500 with one hand. The user may support and hold a side surface of the electronic device 500 with some fingers, and click or drag an icon displayed on the touch screen 530 with another finger.

According to an embodiment, the electronic device 500 may recognize at least one touch input that is input to the touch screen 530 and corresponds to each finger. According to an embodiment, the electronic device 500 may determine whether the recognized at least one touch input is input by the intention of the user.

According to an embodiment, the electronic device 500 may determine whether the touch input of the user is input by the intention of the user based on where a point at which the touch input of the user is separated from the touch screen 530 is located with respect to a specified region 540.

According to an embodiment, the electronic device 500 may sense the touch input of the user and set (or determine) the specified region 540 having the specified radius R. For example, the touch input of the user may move along a first path P1. The first path P1 may include a first point a1, a second point a2, a third point m1, and a fourth point m2.

According to an embodiment, the electronic device 500 may recognize the first point a1 at which the touch input of the user reaches the second portion 520 of the touch screen 530. For example, the electronic device 500 may recognize a point at which a force or a pressure is newly applied to the touch screen 530 as the first point a1. According to an embodiment, the electronic device 500 may set the specified region 540 having the specified radius R from the first point a1.

According to an embodiment, the electronic device 500 may recognize at least one point before the touch input of the user is separated from the touch screen 530 from a state of being in contact with the touch screen 530. For example, the electronic device 500 may sense the touch input of the user at a certain period in the state in which the touch input of the user is in contact with the touch screen. For example, when the user clicks the touch screen 530 with the finger, the user's finger may move minutely while the user's finger is in contact with the touch screen 530. Referring to FIG. 5, in the state in which the touch input of the user is in contact with the touch screen 530, the electronic device 500 may recognize the third point m1 and the fourth point m2.

According to an embodiment, the electronic device 500 may recognize whether the second point a2 at which the touch input of the user is separated (or released) from the touch screen 530 is located within the specified region. According to an embodiment, when the second point a2 is located within the specified region 540, the electronic device 500 may determine that the touch input of the user is not input to the touch screen 530 by the intention of the user. For example, the intention of the user may include an intention for executing a specific application. For example, the electronic device 500 may determine that the sensed touch input is occurred when the portion of the user's hand comes into contact with the touch screen 530 when the user holds the electronic device 500. According to an embodiment, the electronic device 500 may determine that the sensed touch input is not related to the intention of the user for activating the specific event, and ignore the sensed touch input.

According to an embodiment, when the second point a2 is located out of the specified region 540, the electronic device 500 may determine that the touch input is input to the touch screen 530 by the intention of the user. For example, the intention of the user may include the intention to cause the electronic device 500 to activate the event. As another example, the intention of the user may include the intention to cause the electronic device 500 to execute the specific application. According to an embodiment, when the second point a2 is located out of the specified region 540, the electronic device 500 may determine that the touch input that is input is related to an intention of the user for executing a specific application or scrolling the screen, and execute the specific application corresponding to the touch input. Referring to FIG. 5, the electronic device 500 may activate an event corresponding to the first path P1.

According to an embodiment, the electronic device 500 may determine whether the second point a2 is located within the specified region 540 based on coordinate information. For example, the electronic device 500 may generate coordinate information indicating the first point a1, the second point a2, the third point m1, and the fourth point m2 and coordinate information indicating a boundary of the specified region 540. The electronic device 500 may temporarily and/or non-temporarily store the generated coordinate information in a memory (e.g., the memory 130 in FIG. 1 or the memory 320 in FIG. 3).

According to an embodiment, the electronic device 500 may determine whether the second point a2 is located within the specified region 540 based on the stored coordinate information, and when the second point a2 is located within the specified region 540, may select the touch input related to the intention of the user and activate an event corresponding to such touch input.

According to an embodiment of the disclosure, when the touch input of the user is sensed, the electronic device 500 may determine the intention of the touch input of the user to prevent an event corresponding to the touch input that is not intended by the user from being activated.

According to an embodiment, the electronic device 500 may activate the touch input of the user based on a duration the touch input of the user stays on the touch screen 530. Referring to FIG. 5, a difference between the first time point t1 and the second time point t2 may correspond to the duration during which the touch input of the user stays on the touch screen 530.

For example, when the duration during which the touch input of the user stays on the touch screen 530 is relatively short, the electronic device 500 may determine that the touch input of the user is input to the touch screen 530 by the intention of the user. As another example, when the duration during which the touch input of the user stays on the touch screen 530 is relatively long, the electronic device 500 may determine that the touch input of the user is not input to the touch screen 530 by the intention of the user.

For example, the electronic device 500 may recognize the first point a1 at which the touch input of the user comes into contact with the touch screen 530 and the first time point t1 indicating a time point at which the first point a1 is recognized. For example, the electronic device 500 may recognize the second point a2 at which the touch input of the user is separated (or released) from the touch screen 530 and the second time point t2 indicating a time point at which the second point a2 is recognized. According to an embodiment, the electronic device 500 may temporarily and/or non-temporarily store the first time point t1 and the second time point t2 in the memory (e.g., the memory 130 in FIG. 1 or the memory 320 in FIG. 3).

According to an embodiment, the electronic device 500 may reduce the event corresponding to the touch input that is not intended by the user from being activated based on whether the duration during which the touch input of the user stays on the touch screen 530 corresponding to the difference between the first time point t1 and the second time point t2 exceeds the specified duration.

In an embodiment, when the touch input in which the second point a2 is located within the specified region 540 is sensed, the electronic device 500 may determine whether the difference between the first time point t1 and the second time point t2 is equal to or shorter than the specified duration.

In an embodiment, when the difference between the first time point t1 and the second time point t2 is equal to or shorter than the specified duration, the electronic device 500 may determine that the touch input is related to the intention of the user, and may activate the event corresponding to the touch input of the user. For example, the user may click a specific icon displayed on the touch screen 530 to execute the specific application. When the user clicks the specific icon, the electronic device 500 may sense a touch input with a duration during which the touch input stays on the touch screen 530 is equal to or shorter than the specified duration. The electronic device 500 may activate an event of clicking the specific icon in response to the sensed touch input.

In an embodiment, when the difference between the first time point t1 and the second time point t2 exceeds the specified duration, the electronic device 500 may determine that the touch input of the user is not input to the touch screen 530 by the intention of the user, and deactivate an event corresponding to the touch input of the user. For example, when the user holds the electronic device 500 with one hand, the portion of the body may reach the touch screen 530. For example, in addition to a finger clicking the specific icon, the other four fingers of the user may reach the touch screen 530 to grip the electronic device 500. For example, touch inputs of the user corresponding to the four fingers reaching the touch screen 530 may not be input by the intention of the user (e.g., the click). For example, the touch inputs of the user corresponding to the four fingers may be maintained on the touch screen 530 for a relatively long time compared to the finger clicking the specific icon. For example, the electronic device 500 may determine that the difference between the first time point t1 and the second time point t2 of each of the touch inputs of the user respectively corresponding to the four fingers exceeds the specified duration. The electronic device 500 may ignore the sensed touch input without activating events related to the touch inputs corresponding to the four fingers. In an embodiment, an order in which the electronic device 500 determines whether the duration during which the touch input of the user stays on the touch screen 530 exceeds the specified duration and whether the second point a2 is located within the specified region 540 may be reversed. For example, the electronic device 500 may first determine whether a duration during which the second point a2 is maintained in the specified region 540 exceeds the specified duration. In another example, the electronic device 500 may first determine whether the duration during which the touch input of the user stays on the touch screen 530 exceeds the specified duration.

According to an embodiment, as described above, the electronic device 500 may determine whether the touch input of the user meets the intention of the user based on at least one of whether the second point a2 at which the touch input of the user is separated from the touch screen 530 is located within the specified region and whether the duration during which the touch input of the user stays on the touch screen 530 exceeds the specified duration. Accordingly, the electronic device 500 according to an embodiment may prevent the event corresponding to the touch input unintentionally provided by the user from being activated. According to an embodiment, when the first point a1 at which the touch input of the user reaches the touch screen 530 is included in the first portion 510, the electronic device 500 may determine that the touch input of the user meets the intention of the user, and may execute the event corresponding to the touch input of the user.

Figure 6:
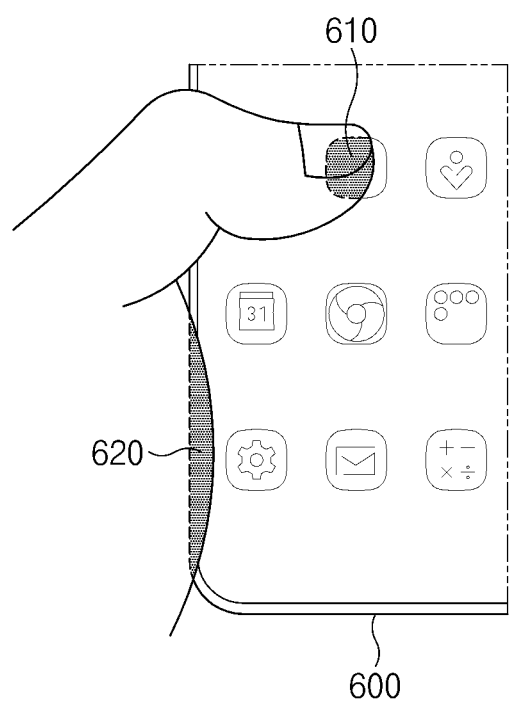
FIG. 6 is a diagram illustrating activation of a touch input of a user based on an area of the touch input of the user, by an electronic device according to an embodiment.

FIG. 6 is a diagram illustrating activation, by an electronic device, of a touch input of a user based on an area of the touch input of the user according to an embodiment.

According to an embodiment, the user may hold an electronic device 600 (e.g., the electronic device 101 in FIG. 1, the electronic device 200 in FIG. 2, the electronic device 300 in FIG. 3, the electronic device 400 in FIG. 4, or the electronic device 500 in FIG. 5) using the portion of the body (e.g., the hand). For example, the user may control the electronic device 600 such that a specific event is activated while holding the electronic device 600 in one hand. For example, the user may apply a touch input to the touch screen to activate an application of the electronic device 600.

According to an embodiment, the user may intentionally click a first region 610 using the finger. According to an embodiment, an area of the first region 610 may be relatively smaller than that of a second region 620. According to an embodiment, the second region 620 may include a region the portion of the user's hand unintentionally reaches. The area of the second region 620 may be relatively larger than that of the first region 610.

According to an embodiment, the electronic device 600 may determine whether the touch input is the touch input by the intention of the user based on an area of the touch input provided to the touch screen. For example, the electronic device 600 may store information about the area for determining whether the touch of the user is related to the intention of the user in the memory.

For example, when the area of the touch input of the user exceeds the threshold value, the electronic device 600 may determine that the touch input does not meet the intention of the user, and may not activate the event corresponding to the touch input.

For example, when the area of the touch input of the user is equal to or smaller than the threshold value, the electronic device 600 may determine that the touch input meets to the intention of the user, and may activate the event corresponding to the touch input.

Figure 7:
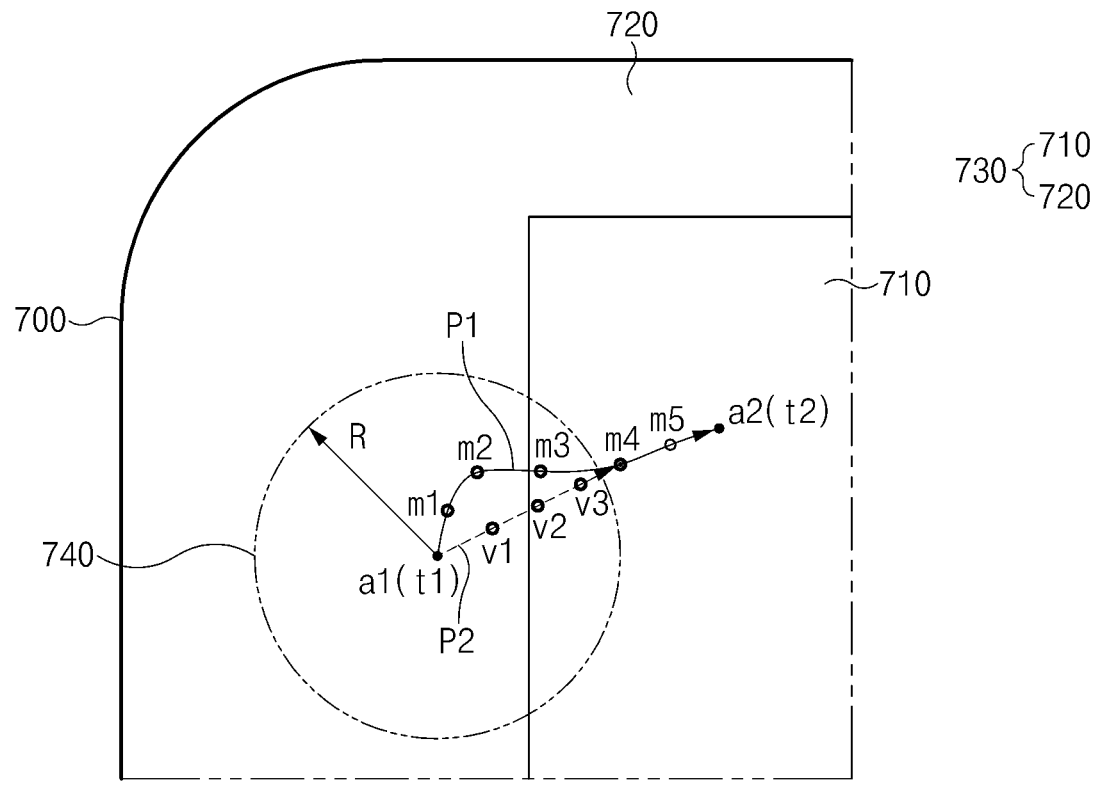
FIG. 7 is a diagram illustrating treatment, by an electronic device, of a touch input provided by an intention of a user according to an embodiment.

FIG. 7 is a diagram illustrating treatment, by an electronic device, of a touch input provided by an intention of a user according to an embodiment.

According to an embodiment, an electronic device 700 (e.g., the electronic device 101 in FIG. 1, an electronic device 200 in FIG. 2, the electronic device 300 in FIG. 3, the electronic device 400 in FIG. 4, the electronic device 500 in FIG. 5, or the electronic device 600 in FIG. 6) may include a touch screen 730 (e.g., the display device 160 in FIG. 1, the touch screen 210 in FIG. 2, the touch screen 310 in FIG. 3, the touch screen 430 in FIG. 4, or the touch screen 530 in FIG. 5). The touch screen 730 according to an embodiment may include a first portion 710 and a second portion 720.

According to an embodiment, the first path P1 may include the first point a1, the second point a2, the third point m1, the fourth point m2, a fifth point m3, a sixth point m4, and a seventh point m5. For example, a second path P2 may include at least one of a first virtual point v1, a second virtual point v2, and a third virtual point v3, and may include the first point a1 and the second point a2.

According to an embodiment, the electronic device 700 may sense a touch input of the user corresponding to the first path P1. The touch input of the user corresponding to the first path P1 may include the first point a1 at which the touch input of the user reaches the touch screen 730 and the second point a2 at which the touch input of the user is separated from the touch screen 730. According to an embodiment, the first point a1 may be located in the second region 720 of the touch screen 730, and the second point a2 may be located out of a specified region 740 within the specified duration. For example, the user may provide the touch input corresponding to the first path P1 to the touch screen 730 with an intention to perform a drag operation such that the touch input of the user is located at the second point a2 from the first point a1 within a short duration.

According to an embodiment, the electronic device 700 may treat at least one point located in the specified region among the points included in the first path P1 as invalid.

According to an embodiment, between the first time point t1 at which the first point a1 is recognized and the second time point t2 at which the second point a2 is recognized, the electronic device 700 may periodically recognize at least one point while the touch input of the user is in contact with the touch screen 730. For example, the electronic device 700 may store location information and/or time point information about each of the third point m1, the fourth point m2, and the fifth point m3 in a memory (e.g., the memory 130 in FIG. 1 or the memory 320 in FIG. 3).

According to an embodiment, the electronic device 700 may delete at least a portion of the information stored in the memory. The electronic device 700 may deactivate the touch input of the user corresponding to the first path P1 by deleting the portion of the information stored in the memory. For example, when recognizing the sixth point m4 located out of the specified region 740, the electronic device 700 may delete the location information respectively corresponding to the third point m1, the fourth point m2, and the fifth point m3 stored in the memory. For example, the electronic device 700 may set a virtual line including the first point a1 and the sixth point m4, and may generate at least one virtual point included on the virtual line.

The electronic device 700 according to an embodiment may be in a standby state for a certain duration without activating the touch input of the user in real time while recognizing the point located within the specified region 740. When recognizing the sixth point m4 located out of the specified region 740, the electronic device 700 according to an embodiment may generate the at least one virtual point, and may activate a touch input of the user corresponding to the second path P2 including the sixth point m4 and the seventh point m5 located out of the specified region 740 in real time without a standby time. For example, the electronic device 700 may activate the touch input of the user corresponding to the second path P2 including the at least one virtual point generated based on the recognition of the sixth point m4 and the first point a1 and the sixth point m4 in real time.

According to an embodiment, the electronic device 700 may activate the touch input of the user corresponding to the second path P2 replacing the first path P1. The electronic device 700 may generate the second path P2. For example, the electronic device 700 may generate at least one point located within the specified region on the line connecting the first point a1 and the sixth point m4 located out of the specified region with each other. For example, the electronic device 700 may generate at least one of the first virtual point v1, the second virtual point v2, and the third virtual point v3. The electronic device 700 may store location information and time point information corresponding to the generated virtual point in the memory. The electronic device 700 may activate the touch input of the user in response to the second path P2 generated based on the information stored in the memory. According to an embodiment, when the first point a1 is located in the first portion 710 of the touch screen 730, the electronic device 700 may determine that the touch input of the user is intentionally input by the user, and perform an event corresponding to such touch input.

Figure 8:
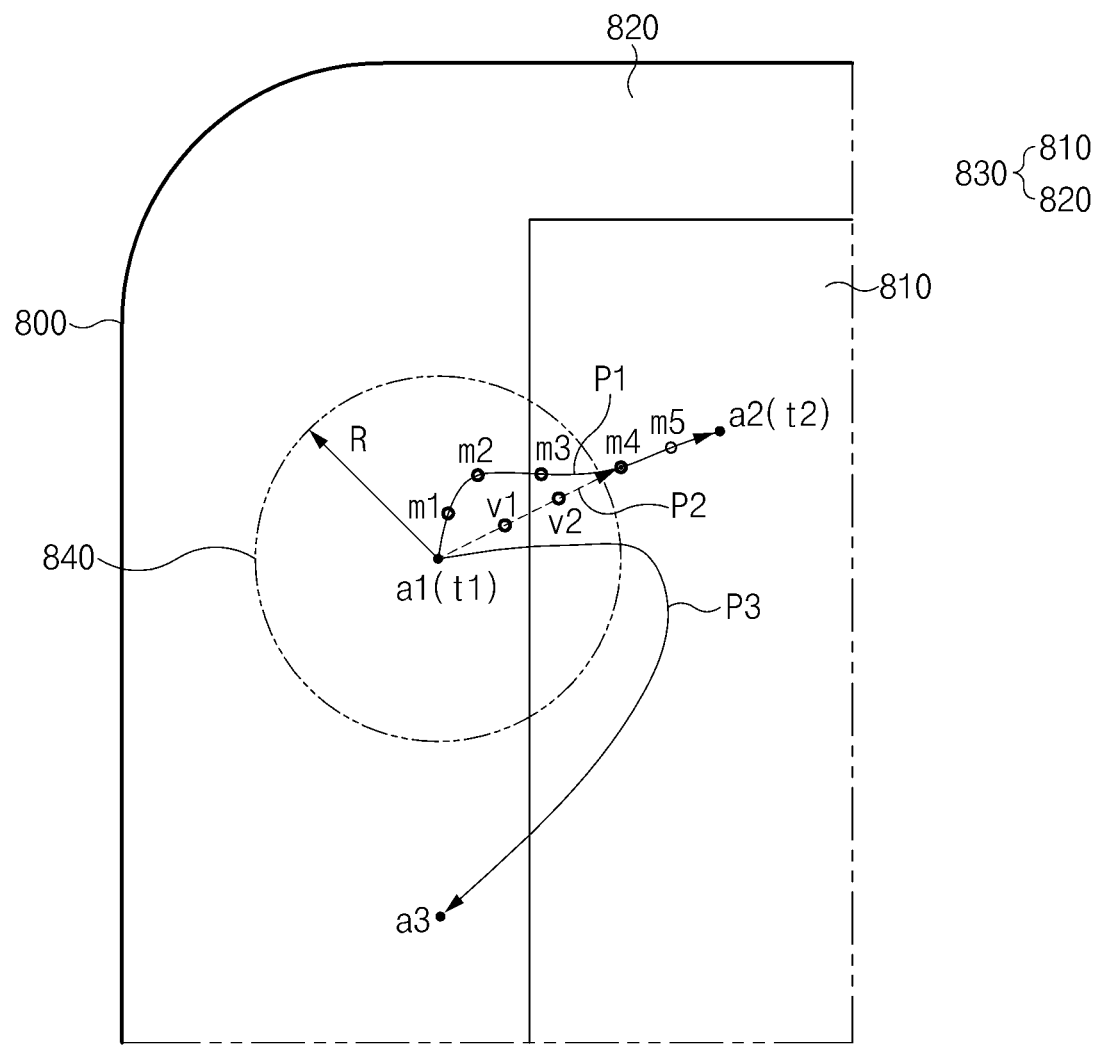
FIG. 8 is a diagram illustrating activation, by an electronic device, of a touch input of a user corresponding to a third path according to an embodiment.

FIG. 8 is a diagram illustrating activation, by an electronic device, of a touch input of a user corresponding to a third path according to an embodiment.

According to an embodiment, an electronic device 800 (e.g., the electronic device 101 in FIG. 1, the electronic device 200 in FIG. 2, the electronic device 300 in FIG. 3, the electronic device 400 in FIG. 4, the electronic device 500 in FIG. 5, the electronic device 600 in FIG. 6, or the electronic device 700 in FIG. 7) may include a touch screen 830 (e.g., the display device 160 in FIG. 1, the touch screen 210 in FIG. 2, the touch screen 310 in FIG. 3, the touch screen 430 in FIG. 4, the touch screen 530 in FIG. 5, or the touch screen 730 in FIG. 7). The touch screen 830 according to an embodiment may include a first portion 810 and a second portion 820.

According to an embodiment, the electronic device 800 may determine whether to activate a touch input regardless of where a point at which the touch input is separated from the touch screen 830 is located among the first region 810 and the second region 820.

For example, the electronic device 800 may sense a touch input of the user corresponding to a third path P3. Referring to FIG. 8, the third path P3 may include a third point a3 at which the touch input is separated from the touch screen 830. The third point a3 may be located in the second region 820 differently from the second point a2. The electronic device 800 may activate the touch input corresponding to the third path P3 regardless of whether the region where the third point a3 is located is the first region 810 or the second region 820. According to an embodiment, the electronic device 800 may determine that the touch input meets the intention of the user and activate the touch input regardless of whether the region where the third point a3 that is located out of the specified region within the specified duration is located is the first region 810 or the second region 820.

Figure 9:
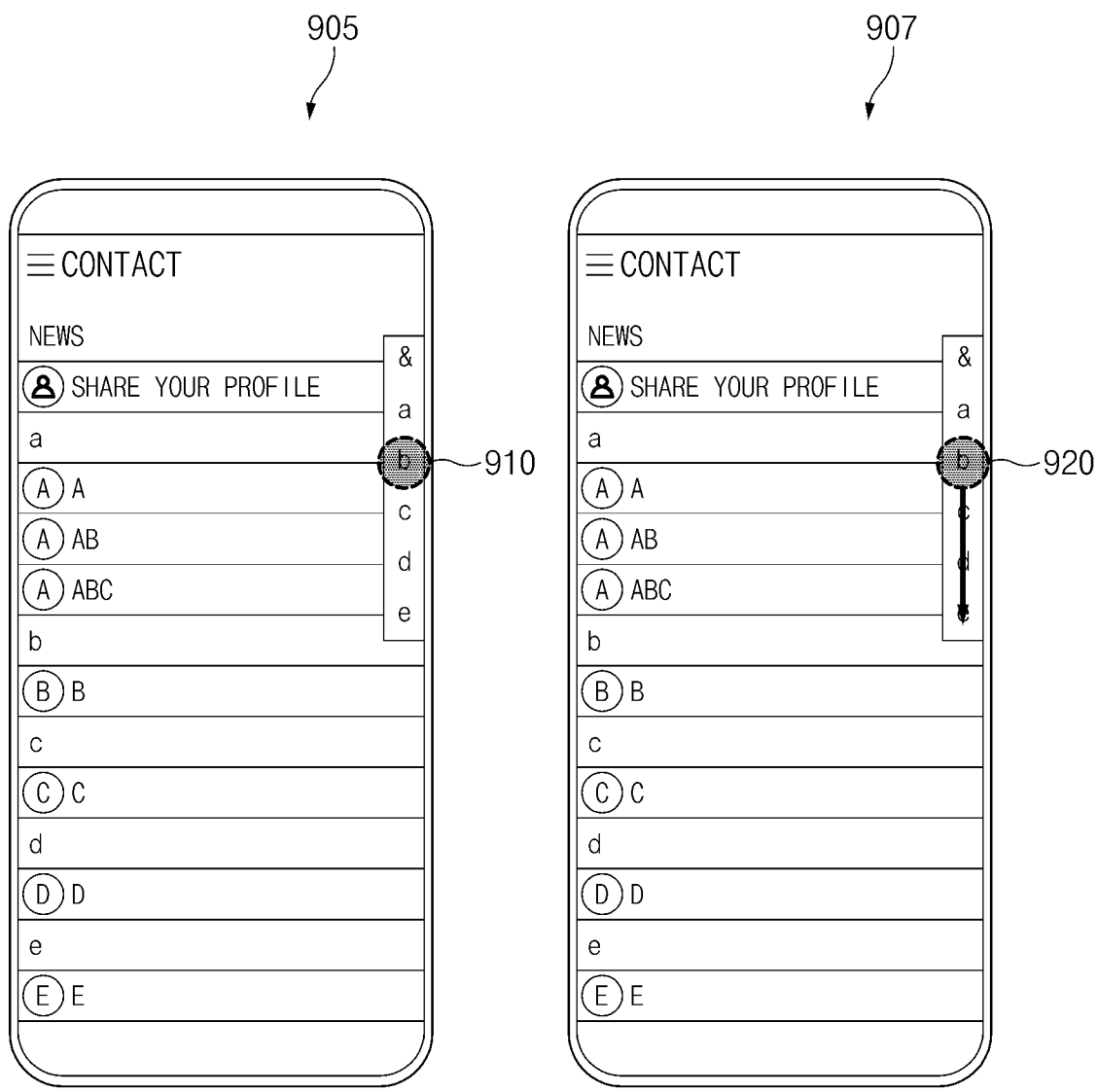
FIG. 9 is a diagram illustrating an example electronic device according to an embodiment.

FIG. 9 is a diagram illustrating an electronic device according to an embodiment.

A first screen 905 in FIG. 9 illustratively shows that the user clicks a portion of the touch screen. A second screen 907 in FIG. 9 illustratively shows that the user drags the portion of the touch screen.

Referring to the first screen 905 in FIG. 9, the user may provide a touch input of clicking a first point 910 to the touch screen using the part of the body (e.g., the finger). When the user clicks the touch screen, a point at which the portion of the user's body reaches the touch screen and a point at which the portion of the user's body is separated from the touch screen are close to each other, and a duration spent on the touch screen may be equal to or shorter than the specified duration. According to an embodiment, the duration during which the touch input of the user stays on the touch screen is equal to or shorter than the specified duration and the point at which the touch input of the user is separated from the touch screen is within the specified region, so that the electronic device may activate the touch input of the user. The electronic device may determine that the touch input of the user is provided by the intention of the user (e.g., the click). According to an embodiment, the electronic device may activate an event corresponding to the click intended by the user.

Referring to the second screen 907 in FIG. 9, the user may provide, to the touch screen, a touch input of dragging from the second point 920 using the portion of the body. When the user drags the portion of the touch screen, a point at which the touch input reaches the touch screen and a point at which the touch input is separated from the touch screen may be far from each other. For example, the point at which the touch input is separated from the touch screen may be located out of the specified region. When the user drags the portion of the touch screen, a duration during which the portion of the user's body stays on the touch screen may be or equal to or shorter than the specified duration. According to an embodiment, the point at which the touch input is separated from the touch screen is located out of the specified region and the duration during which the touch input of the user stays is equal to or shorter than the specified duration, so that the electronic device may activate the touch input of the user. The electronic device may determine that the touch input of the user is provided by the intention of the user (e.g., the drag). According to an embodiment, the electronic device may activate an event corresponding to the drag intended by the user.

An electronic device (e.g., the electronic device 101 in FIG. 1, the electronic device 200 in FIG. 2, the electronic device 300 in FIG. 3, the electronic device 400 in FIG. 4, the electronic device 500 in FIG. 5, the electronic device 600 in FIG. 6, the electronic device 700 in FIG. 7, or the electronic device 800 in FIG. 8) according to an example embodiment of the disclosure may include: a touch screen (e.g., the display device 160 in FIG. 1, the touch screen 210 in FIG. 2, the touch screen 310 in FIG. 3, the touch screen 430 in FIG. 4, the touch screen 530 in FIG. 5, the touch screen 730 in FIG. 7, or the touch screen 830 in FIG. 8) including a first portion and a second portion, a memory (e.g., the memory 130 in FIG. 1 or the memory 320 in FIG. 3), and a processor (e.g., the processor 120 in FIG. 1 or the processor 330 in FIG. 3) operatively connected to the touch screen and the memory. The memory may store instructions that, when executed, cause the processor to: recognize a first point where a touch input reaches the second portion, recognize a second point where the touch input is separated (or released) from the touch screen, periodically recognize one or more third points where the touch input reaches the touch screen while the touch input is in contact with the touch screen, and activate the touch input based on whether at least one of the second point and the one or more third points is located out of a specified region having a specified radius set with respect to the first point.

According to an example embodiment, the first portion may include a planar region of the touch screen, and the second portion may include a curved region of the touch screen.

According to an example embodiment, the specified radius may be determined based on a curvature of the second portion.

According to an example embodiment, the second portion may include a region within a specified distance from an edge of the touch screen, and the first portion may include a region other than the second portion of the touch screen.

According to an example embodiment, the instructions, when executed, may cause the processor to: activate the touch input based on the at least one of the second point and the one or more third points being located out of the specified region having the specified radius set with respect to the first point, and deactivate the touch input based on the second point and the one or more third points being located within the specified region.

According to an example embodiment, the instructions, when executed, may cause the processor to: generate one or more virtual touch points on a straight line connecting the at least one point located out of the specified region with the first point based on the at least one of the second point and the one or more third points being located out of the specified region, and perform an operation corresponding to the touch input based on at least some of the one or more virtual touch points.

According to an example embodiment, each of the first point, the second point, and the one or more third points may have coordinate information corresponding to the touch screen, and the instructions, when executed, may cause the processor to: generate one or more virtual coordinate information respectively corresponding to the one or more virtual touch points based on the at least one of the second point and the one or more third points being located out of the specified region, and perform an operation corresponding to the touch input based on at least some of the one or more virtual coordinate information.

According to an example embodiment, the instructions, when executed, may cause the processor to: at least temporarily store the coordinate information of each of the first point, the second point, and the one or more third points in the memory, and delete coordinate information of a point located within the specified region among the one or more third points from the memory based on generating the one or more virtual coordinate information respectively corresponding to the one or more virtual touch points.

According to an example embodiment, the instructions, when executed, may cause the processor to: deactivate the touch input based on a difference between a first time point at which the first point is recognized and a second time point at which the second point is recognized exceeding a set specified duration, and activate the touch input based on the difference between the first time point and the second time point being equal to or less than the set specified duration.

According to an example embodiment, the instructions, when executed, may cause the processor to: recognize an area of the touch input in contact with the touch screen, deactivate the touch input based on the area exceeding a set specified area, and activate the touch input based on the area being equal to or less than the set specified area.

An electronic device (e.g., the electronic device 101 in FIG. 1, the electronic device 200 in FIG. 2, the electronic device 300 in FIG. 3, the electronic device 400 in FIG. 4, the electronic device 500 in FIG. 5, the electronic device 600 in FIG. 6, the electronic device 700 in FIG. 7, or the electronic device 800 in FIG. 8) according to an example embodiment of the disclosure may include: a touch screen (e.g., the display device 160 in FIG. 1, the touch screen 210 in FIG. 2, the touch screen 310 in FIG. 3, the touch screen 430 in FIG. 4, the touch screen 530 in FIG. 5, the touch screen 730 in FIG. 7, or the touch screen 830 in FIG. 8) including a first portion and a second portion, a memory (e.g., the memory 130 in FIG. 1 or the memory 320 in FIG. 3), and a processor (e.g., the processor 120 in FIG. 1 or the processor 330 in FIG. 3) operatively connected to the touch screen and the memory. According to an example embodiment, the memory may store instructions that, when executed, cause the processor to: recognize a first point where a touch input reaches the second portion, recognize a second point where the touch input is separated (or released) from the touch screen, periodically recognize one or more third points where the touch input reaches the touch screen while the touch input is in contact with the touch screen, and activate the touch input based on whether a difference between a time at which the first point is recognized and a time at which the second point is recognized exceeds a specified duration.

According to an example embodiment, the instructions, when executed, may cause the processor to: deactivate the touch input based on a difference between a time point at which the first point is recognized and a time point at which the second point is recognized exceeding a set specified duration, and activate the touch input based on the difference between the first time point at which the first point is recognized and the second time point at which the second point is recognized being equal to or less than the set specified duration.

According to an example embodiment, the first portion may include a planar region of the touch screen, and the second portion may include a curved region of the touch screen.

According to an example embodiment, the third point may be located out of a specified region having a specified radius corresponding to the curved region, and the instructions, when executed, may cause the processor to: deactivate the touch input based on the difference between the time point at which the first point is recognized and the time point at which the second point is recognized exceeding the specified duration, and activate the touch input based on the difference between the first time point at which the first point is recognized and the second time point at which the second point is recognized being equal to or less than the specified duration.

Figure 10:
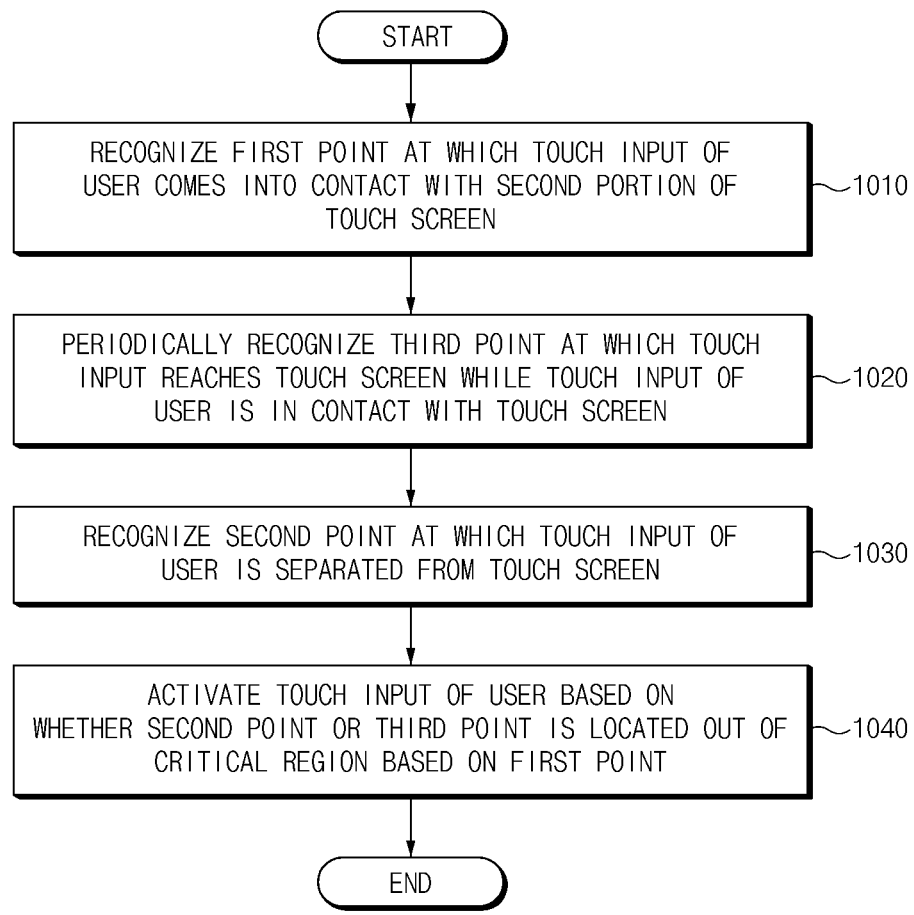
FIG. 10 is a flowchart illustrating an example method of operating an electronic device according to an embodiment.

FIG. 10 is a flowchart illustrating an example method of operating an electronic device according to an embodiment.

According to an embodiment, in operation 1010, an electronic device (e.g., the electronic device 101 in FIG. 1, the electronic device 200 in FIG. 2, the electronic device 300 in FIG. 3, the electronic device 400 in FIG. 4, the electronic device 500 in FIG. 5, the electronic device 600 in FIG. 6, the electronic device 700 in FIG. 7, or the electronic device 800 in FIG. 8) may recognize a first point at which a touch input of a user comes into contact with a second portion of a touch screen (e.g., the display device 160 in FIG. 1, the touch screen 210 in FIG. 2, the touch screen 310 in FIG. 3, the touch screen 430 in FIG. 4, the touch screen 530 in FIG. 5, the touch screen 730 in FIG. 7, or the touch screen 830 in FIG. 8). For example, the electronic device may include the touch screen including a first portion and the second portion. The first portion may be relatively located at a center of the touch screen compared to the second portion based on an edge boundary (e.g., the edge boundary 460 in FIG. 4) determined based on a curvature of a curved side surface or a size of a bezel of the electronic device. The second portion may be relatively located at an edge of the touch screen compared to the first portion based on the edge boundary (e.g., the edge boundary 460 in FIG. 4) determined based on the curvature of the curved side surface or the size of the bezel of the electronic device. For example, the electronic device may sense the touch input of the user reaching the touch screen using at least one of a resistive film scheme, a capacitive scheme, an ultrasonic scheme, and an infrared scheme. The electronic device may recognize the first point at which the touch input of the user starts to come into contact with the second portion of the touch screen. According to an embodiment, in operation 1020, the electronic device may periodically recognize a third point at which the touch input reaches the touch screen while the touch input of the user is in contact with the touch screen. For example, the electronic device may recognize a point at which a pressure or a force of the greatest magnitude is sensed among the regions in which the touch input of the user is in contact with the touch screen. Because the touch input of the user may move minutely even when in contact with the touch screen, the electronic device may periodically recognize the point at which the pressure or the force with the greatest magnitude is applied.

According to an embodiment, in operation 1030, the electronic device may recognize a second point at which the touch input of the user is separated from the touch screen. According to an embodiment, the electronic device may temporarily and/or non-temporarily store information about the first point, information about the second point, and information about the third point in a memory. For example, the information may include at least one of information of a time point and a location at which each point is recognized. For example, the location information may include coordinate information based on a first axis (e.g., an X-directional axis) and a second axis (e.g., a Y-directional axis) of the touch screen.

According to an embodiment, in operation 1040, the electronic device may activate the touch input of the user based on whether the second point or the third point is located out of a specified region based on the first point. For example, the electronic device may set the specified region having a specified radius based on the first point. For example, when the electronic device recognizes the second point located within the specified region, the electronic device may deactivate the touch input of the user. For example, when the electronic device recognizes the second point located out of the specified region, the electronic device may activate the touch input of the user.

Figure 11:
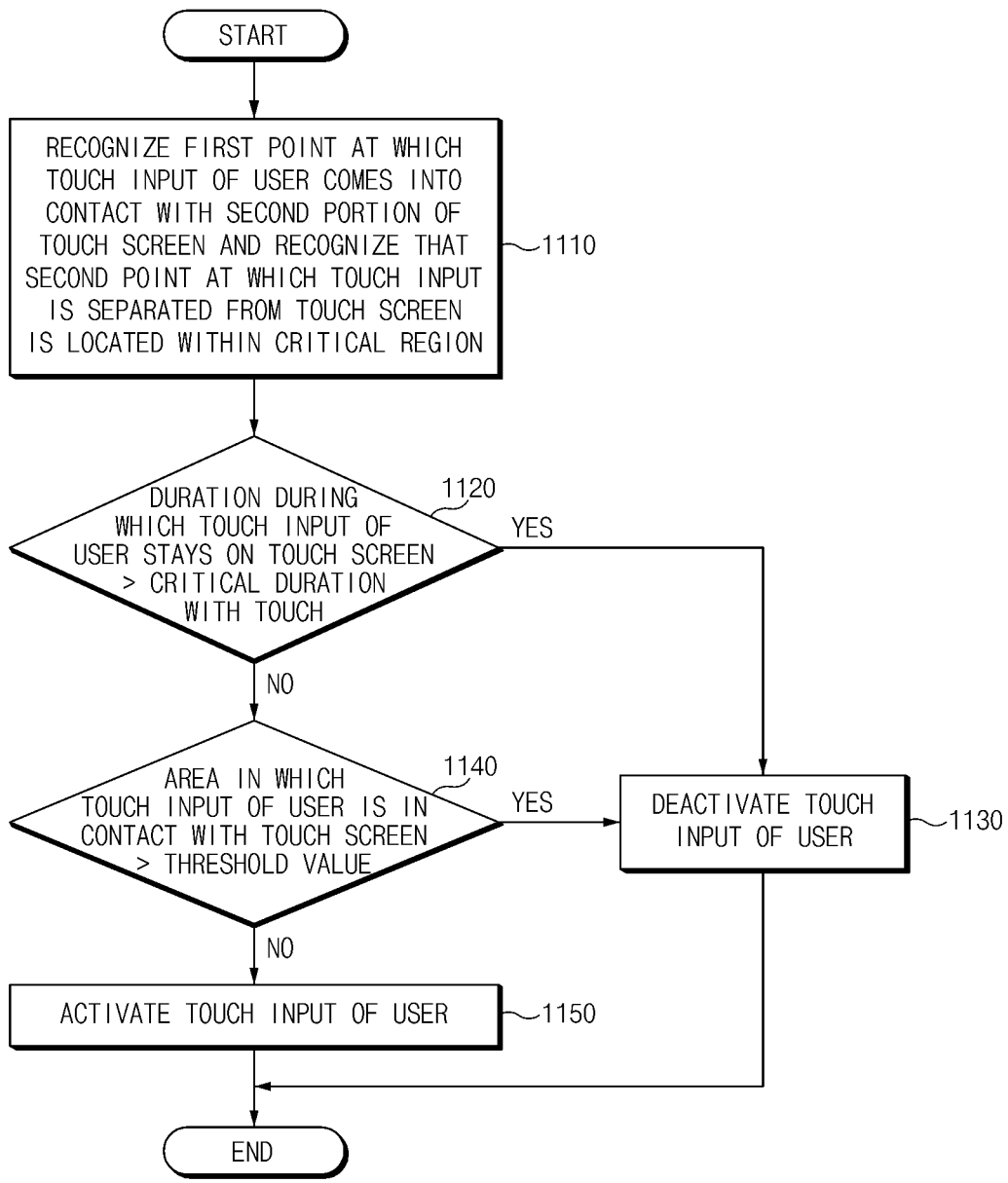
FIG. 11 is a flowchart illustrating an example method of operating an electronic device according to an embodiment.

FIG. 11 is a flowchart illustrating an example method of operating an electronic device according to an embodiment.

According to an embodiment, in operation 1110, an electronic device (e.g., the electronic device 101 in FIG. 1, the electronic device 200 in FIG. 2, the electronic device 300 in FIG. 3, the electronic device 400 in FIG. 4, the electronic device 500 in FIG. 5, the electronic device 600 in FIG. 6, the electronic device 700 in FIG. 7, or the electronic device 800 in FIG. 8) may recognize a first point at which a touch input of a user comes into contact with a second portion of a touch screen (e.g., the display device 160 in FIG. 1, the touch screen 210 in FIG. 2, the touch screen 310 in FIG. 3, the touch screen 430 in FIG. 4, the touch screen 530 in FIG. 5, the touch screen 730 in FIG. 7, or the touch screen 830 in FIG. 8), and recognize that the second point at which the touch input is separated from the touch screen is located within a specified region.

According to an embodiment, in operation 1120, the electronic device may determine whether a duration during which the touch input of the user stays on the touch screen exceeds a specified duration. For example, the electronic device may recognize a first time point at which the touch input of the user reaches the touch screen. The electronic device may recognize a second time point at which the touch input of the user is separated from the touch screen. For example, when a difference between the first time point and the second time point exceeds the specified duration, the electronic device may proceed with operation 1130. In another example, when the difference between the first time point and the second time point is equal to or shorter than the specified duration, the electronic device may proceed with operation 1140.

According to an embodiment, when the duration in operation 1120 exceeds the specified duration, in operation 1130, the electronic device may deactivate the touch input of the user. For example, the electronic device may determine that the touch input of the user is occurred as a portion of a user's body unintentionally reaches the touch screen and deactivate the touch input.

According to an embodiment, in operation 1140, the electronic device may determine whether an area in which the touch input of the user is in contact with the touch screen exceeds a threshold value. For example, the electronic device may proceed to operation 1130 when the area in which the touch of the user is in contact with the touch screen exceeds the threshold value. For example, when the user tries to click the touch screen with one hand, a portion of a palm may unintentionally reach the touch screen. An area corresponding to the portion of the palm reaching the touch screen may be larger than the threshold value. The electronic device may determine that the touch input with the area exceeding the threshold value does not meet the intention of the user, and may proceed with operation 1130. In another example, when the area in which the touch of the user reaches the touch screen is smaller than the threshold value, the electronic device may determine that the touch input meets the intention of the user, and may proceed with operation 1150.

According to an embodiment, in operation 1150, the electronic device may activate the touch input of the user. For example, the electronic device may activate an event corresponding to the touch input of the user.

Figure 12:
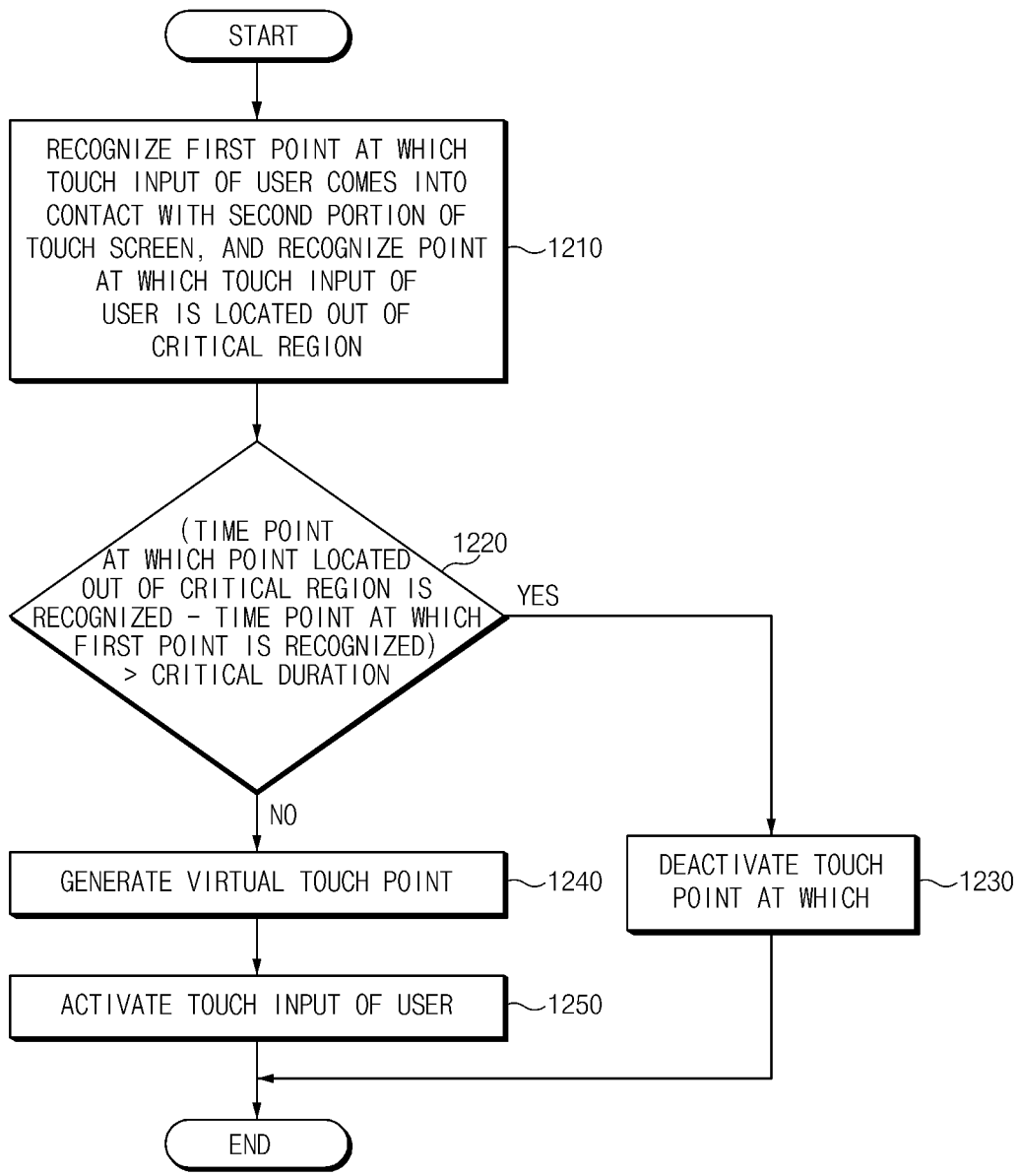
FIG. 12 is a flowchart illustrating an example method of operating an electronic device according to an embodiment.

FIG. 12 is a flowchart illustrating an example method of operating an electronic device according to an embodiment.

According to an embodiment, in operation 1210, an electronic device (e.g., the electronic device 101 in FIG. 1, the electronic device 200 in FIG. 2, the electronic device 300 in FIG. 3, the electronic device 400 in FIG. 4, the electronic device 500 in FIG. 5, the electronic device 600 in FIG. 6, the electronic device 700 in FIG. 7, or the electronic device 800 in FIG. 8) may recognize a first point at which a touch input of a user comes into contact with a second portion of a touch screen, and recognize a point at which the touch input of the user is located out of a specified region.

In an embodiment, the electronic device may periodically recognize a point corresponding to the touch input of the user. For example, the electronic device may recognize a first point at which the touch input of the user comes into contact with a second portion of a touch screen (e.g., the display device 160 in FIG. 1, the touch screen 210 in FIG. 2, the touch screen 310 in FIG. 3, the touch screen 430 in FIG. 4, the touch screen 530 in FIG. 5, the touch screen 730 in FIG. 7, or the touch screen 830 in FIG. 8). The electronic device may recognize a point located out of a specified region set based on the first point as the touch input of the user moves while being in contact with the touch screen.

According to an embodiment, the electronic device may be in a standby state without activating the touch input of the user in real time until the time point of recognizing the point located out of the specified region. In this regard, the electronic device may be in a state in which information about the point corresponding to the touch input of the user is stored in a memory.

According to an embodiment, in operation 1220, the electronic device may determine whether a difference between a time point of recognizing the point located out of the specified region and a time point of recognizing the first point exceeds a specified duration. When the difference between the time point of recognizing the point located out of the specified region and the time point of recognizing the first point exceeds the specified duration, the electronic device may perform operation 1230. For example, when the difference between the time point of recognizing the point located out of the specified region and the time point of recognizing the first point exceeds the specified duration, the electronic device may determine that the touch input of the user does not meet an intention of the user. When the difference between the time point of recognizing the point located out of the specified region and the time point of recognizing the first point is equal to or shorter than the specified duration, the electronic device may perform operation 1240.

According to an embodiment, in operation 1230, the electronic device may deactivate the touch input of the user. For example, the electronic device may determine that the touch input of the user is occurred as a portion of a user's body unintentionally reaches the touch screen, and may deactivate the touch input of the user.

According to an embodiment, in operation 1240, the electronic device may generate a virtual touch point.

The electronic device according to an embodiment may treat location information about a touch point of the user located within the specified region as invalid based on the fact that the difference between the time point of recognizing the point located out of the specified region and the time point of recognizing the first point is equal to or shorter than the specified duration. For example, the electronic device may delete the location information corresponding to the point located within the specified region of location information stored in the memory. The electronic device may generate at least one virtual touch point included on a line connecting the first point and the point located out of the specified region with each other. The electronic device may store information about the generated virtual touch point in the memory.

According to an embodiment, in operation 1250, the electronic device may activate the touch input of the user. For example, the electronic device may activate the touch input of the user including the virtual touch point generated in operation 1240. For example, the electronic device may activate the touch input of the user corresponding to a path including the first point, the virtual touch point, and the point located out of the specified region. According to an embodiment, the electronic device may activate an event corresponding to the activated touch input of the user.

A method of operating an electronic device (e.g., the electronic device 101 in FIG. 1, the electronic device 200 in FIG. 2, the electronic device 300 in FIG. 3, the electronic device 400 in FIG. 4, the electronic device 500 in FIG. 5, the electronic device 600 in FIG. 6, the electronic device 700 in FIG. 7, or the electronic device 800 in FIG. 8) including a touch screen (e.g., the display device 160 in FIG. 1, the touch screen 210 in FIG. 2, the touch screen 310 in FIG. 3, the touch screen 430 in FIG. 4, the touch screen 530 in FIG. 5, the touch screen 730 in FIG. 7, or the touch screen 830 in FIG. 8) including a first portion and a second portion, according to an example embodiment of the disclosure may include: recognizing a first point where a touch input reaches the second portion of the touch screen, periodically recognizing one or more third points where the touch input reaches the touch screen while the touch input is in contact with the touch screen, recognizing a second point where the touch input is separated (or released) from the touch screen, and activating the touch input based on whether at least one of the second point and the one or more third points is located out of a specified region having a specified radius set with respect to the first point.

According to an example embodiment, the method may further include storing first location information indicating a location of the first point, second location information indicating a location of the second point, and third location information indicating a location of the third point in a memory included in the electronic device.

According to an example embodiment, the activating of the touch input may include: activating the touch input in response to the at least one of the second point and the one or more third points being located out of the specified region, and deactivating the touch input in response to the second point and the one or more third points being located within the specified region.

According to an example embodiment, the deactivating of the touch input may include deleting at least one of the first location information, the second location information, and the third location information at least partially stored in the memory.

According to an example embodiment, the method may further include: storing first time point information indicating a time point at which the first point is recognized, second time point information indicating a time point at which the second point is recognized, and third time point information indicating a time point at which the third point is recognized in the memory included in the electronic device.

According to an example embodiment, the activating of the touch input at least may partially include determining whether a difference between the first time point information and the second time point information exceeds a specified duration.

According to an example embodiment, the activating of the touch input may include: activating the touch input in response to the at least one of the second point and the one or more third points being located out of the specified region, and deactivating the touch input in response to the second point and the one or more third points being located within the specified region and the difference between the first time point information and the second time point information exceeding the specified duration.

According to an example embodiment, the first portion may include a planar region of the touch screen, and the second portion may include a curved region of the touch screen.

According to an example embodiment, the second portion may include a region within a specified distance from an edge of the touch screen, and the first portion may include a region other than the second portion of the touch screen.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, a home appliance, or the like. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

The term "module" used in the disclosure may include a unit implemented in hardware, software, or firmware, or any combination thereof, and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 140) including an instruction stored in a machine-readable storage medium (e.g., the internal memory 136 or the external memory 138) readable by a machine (e.g., the electronic device 101). For example, the processor (e.g., the processor 120) of a machine (e.g., the electronic device 101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the "non-transitory", storage medium is tangible, but may not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a touch screen including a first portion and a second portion, wherein the first portion is relatively located at a center of the touch screen compared to the second portion and the second portion is relatively located at an edge of the touch screen compared to the first portion;
    a memory; and
    at least one processor operatively connected to the touch screen and the memory, and configured to:
    recognize a first point where a touch input is detected on the second portion;
    recognize a second point where the touch input is released on the first portion or the second portion of the touch screen;
    activate an operation corresponding to the touch input based on the second point being located outside of a specified region having a specified radius set with respect to a location of the first point; and
    deactivate the operation corresponding to the touch input based on the second point being located within the specified region.

2. The electronic device of claim 1, wherein the first portion includes a planar region of the touch screen, wherein the second portion includes a curved region of the touch screen.

3. The electronic device of claim 2, wherein the at least one processor is configured so that the specified radius is to be determined based on a characteristic of the edge of the touch screen or a bezel of the electronic device,
    wherein the characteristic of the edge of the touch screen includes a curvature of the second portion.

4. The electronic device of claim 1, wherein the at least one processor is configured to:
    deactivate the operation corresponding to touch input based on a difference between a first time point at which the first point is recognized and a second time point at which the second point is recognized exceeding a set specified duration; and
    activate the operation corresponding to touch input based on the difference between the first time point and the second time point being equal to or less than the set specified duration.

5. The electronic device of claim 1, wherein the at least one processor is configured to:
    recognize one or more third points where the touch input is detected on the touch screen while the touch input is in contact with the touch screen;
    determine at least one third point being located out of the specified region from among the recognized one or more third points; and
    activate the operation corresponding to the touch input based on the first point, the second point and the at least one third point.

6. The electronic device of claim 5, to wherein the at least one processor is configured to:
    generate one or more virtual touch points on a straight line connecting the at least one third point being located out of the specified region with the first point; and
    activate the operation corresponding to the touch input based on the one or more virtual touch points.

7. The electronic device of claim 6, wherein each of the first point, the second point, and the one or more third points has coordinate information corresponding to the touch screen,
    wherein the at least one processor is configured to:
    generate one or more coordinate information respectively corresponding to the second point, the at least one third point being located out of the specified region, and the one or more virtual touch points; and
    activate the operation corresponding to the touch input based on at least some of the one or more coordinate information.

8. The electronic device of claim 7, wherein the at least one processor is configured to:
    at least temporarily store the coordinate information of each of the first point, the second point, and the one or more third points in the memory; and
    delete coordinate information of a point located within the specified region among the one or more third points from the memory.

9. The electronic device of claim 1, wherein the at least one processor is configured to:
    activate the operation corresponding to touch input based on the second point being located within the specified region and a difference between a first time point at which the first point is recognized and a second time point at which the second point is recognized being equal to or less than a set specified duration.

10. The electronic device of claim 1, wherein the at least one processor is configured to:
    recognize an area of the touch input in contact with the touch screen;

deactivate the operation corresponding to touch input based on the area exceeding a set specified area; and activate the operation corresponding to touch input based on the area being equal to or less than the set specified area.

11. A method of operating an electronic device including a touch screen including a first portion located at a center of the touch screen and a second portion located at an edge of the touch screen, the method comprising:

recognizing a first point where a touch input is detected on the second portion of the touch screen;

recognizing a second point where the touch input is released on the first portion or the second portion of the touch screen;

activating an operation corresponding to the touch input based on the second point being located outside of a specified region having a specified radius set with respect to a location of the first point; and deactivating the operation corresponding to the touch input based on the second point being located within the specified region.

12. The method of claim 11, further comprising:

storing first location information indicating a location of the first point and second location information indicating a location of the second point in a memory included in the electronic device.

13. The method of claim 12, wherein the activating of the operation includes:

recognizing one or more third points where the touch input is detected on the touch screen while the touch input is in contact with the touch screen;

determining at least one third point being located out of the specified region from among the recognized one or more third points; and activating the operation corresponding to the touch input based on the first point, the second point and the at least one third point.

14. The method of claim 12, wherein the deactivating of the operation includes:

deleting at least one of the first location information, and the second location information at least partially stored in the memory.

15. The method of claim 13, further comprising:

storing first time point information indicating a time point at which the first point is recognized, second time point information indicating a time point at which the second point is recognized, and third time point information indicating a time point at which the at least one third point is recognized in the memory included in the electronic device.

16. The method of claim 15, wherein the activating of the operation at least partially includes:

determining whether a difference between the first time point information and the second time point information exceeds a specified duration.

17. The method of claim 16, wherein the activating of the operation includes:

activating the operation corresponding to the touch input in response to the at least one of the second point and the one or more third points being located out of the specified region; and deactivating the operation corresponding to the touch input in response to at least one of the second point and the one or more third points being located within the specified region and the difference between the first time point information and the second time point information exceeding the specified duration.

18. The method of claim 11, wherein the first portion includes a planar region of the touch screen, wherein the second portion includes a curved region of the touch screen.

19. The method of claim 11, wherein the second portion includes a region within a specified distance from an edge of the touch screen, wherein the first portion includes a region other than the second portion of the touch screen.

20. An electronic device comprising:

a touch screen including a first portion located at a center of the touch screen and a second portion located at an edge of the touch screen;

a memory; and at least one processor operatively connected to the touch screen and the memory, and configured to:

recognize a first point where a touch input is detected on the second portion;

recognize a second point where the touch input is released on the first portion the second portion of the touch screen;

activate an operation corresponding to the touch input based on a difference between a time at which the first point is recognized and a time at which the second point is recognized being less than a specified duration; and deactivate the operation corresponding to the touch input based on the difference between the time at which the first point is recognized and the time at which the second point is recognized being greater the specified duration.

* * * * *